US005727389A

United States Patent [19]
Harries

[11] Patent Number: 5,727,389
[45] Date of Patent: Mar. 17, 1998

[54] ACTUATION SYSTEMS

[75] Inventor: David Anthony Harries, Welford on Avon, United Kingdom

[73] Assignee: Automotive Products, plc, Leamington Spa, England

[21] Appl. No.: 666,503
[22] PCT Filed: Nov. 7, 1995
[86] PCT No.: PCT/GB95/02615
  § 371 Date: Jun. 24, 1996
  § 102(e) Date: Jun. 24, 1996
[87] PCT Pub. No.: WO96/15372
  PCT Pub. Date: May 23, 1996

[30] Foreign Application Priority Data

Nov. 9, 1994 [GB] United Kingdom ............ 22579
Nov. 9, 1994 [GB] United Kingdom ............ 22580

[51] Int. Cl.[6] ........................................ F16D 31/02
[52] U.S. Cl. ................................. 60/418; 60/413
[58] Field of Search ............................ 60/413, 418

[56] References Cited
U.S. PATENT DOCUMENTS 2,977,761  4/1961  Lewis ................................ 60/418
3,785,393  1/1974  Tanguy .............................. 60/418
4,332,270  6/1982  Budecker ........................... 60/418

Primary Examiner—F. Daniel Lopez
Attorney, Agent, or Firm—Paul E. Milliken; Lee A. Germain

[57] ABSTRACT

An actuation system for a vehicle in which a pump (10b) draws fluid from a reservoir (10a) to supply one or more first consumers, such as steering valve (50). One of more second consumers, such as a clutch actuator (12), are actuated via a solenoid valve (12a) from an accumulator (10c) charged by the pump. The solenoid valve connects each second actuator (12) to the accumulator or to the reservoir. When the pressure in the accumulator is below a predetermined charge pressure, flow to the first consumer is restricted to a level sufficient to ensure effective operation of the first consumer, while generating a back pressure sufficient to ensure charging of the accumulator. The flow restriction to the first consumer may be achieved by the solenoid valve (12a) or by a separate charging valve (20).

16 Claims, 5 Drawing Sheets

ACTUATION SYSTEMS

This invention relates to fluid pressure operated actuation systems and in particular, though not exclusively, to such actuation systems for the operation of vehicle clutches used in semi-automatic transmissions of the form described in, for example, the Applicants earlier European patents Nos. 0038113, 0043660, 0059035 and 0101220 and other fluid pressure operated functions.

Actuation systems are already known in which a pump supplies pressurised fluid to interconnected closed centre and open centre circuits each of which includes at least one consumer and the closed centre circuits includes an accumulator which is charged by the pump.

Problems arise with such actuating systems in that the operation of the open centre circuit is often affected by the charging of the accumulator in the closed centre circuit.

It is an object of the present invention to provide an actuating system which at least mitigates the above problem.

Thus according to the present invention there is provided an actuation system comprising:

a pump which draws fluid from a reservoir;

one or more first consumers actuated from the pump;

one or more second consumers actuated via valve means from an accumulator charged by the pump;

the valve means being operable to connect the or each second consumer to the accumulator or to the reservoir thus actuating the second consumers and also being operable in response to accumulator pressure levels below a predetermined charge level to restrict the flow of fluid to the or each first consumer to a level sufficient to ensure effective operation of the or each first consumer whilst generating a back pressure sufficient to ensure charging of the accumulator.

By restricting the flow to the first consumer(s) when charging of the accumulator is required in the above manner unaffected operation of the first consumer(s) is ensured.

Both the first and second consumers may be actuated via the valve means.

The valve means may include a first valve having a valve member (such as a spool) which is displaceable both to connect the second consumer(s) to the accumulator or reservoir and also to restrict the flow of fluid to the first consumer(s).

The valve member may be displaced by a solenoid which is activated by a control means which controls operation of the second consumer(s) and also by signals from an accumulator pressure level sensor. Alternatively the displacement of the valve member in response to the accumulator pressure level falling below the predetermined charge level could be achieved by the action of fluid pressure on the valve member.

Where a spool type valve member is used in the first valve means the spool may be provided with one or more grooves or other formation through which the restricted flow to the first consumer(s) takes place.

In an alternative construction the valve means may include a first valve having a valve member which is displaced both to connect the second consumer(s) to the accumulator or reservoir and also to control the rate of charging of the accumulator.

The actuation system may include a separate charging valve means to restrict the flow of fluid to the or each first consumer at accumulator pressure levels below a predetermined charge level.

The actuation system may also include a second valve means to limit the pressure level to which the accumulator can be charged. Conveniently this second valve means may comprise a charging valve and venting valve arrangement of the form 94 20983.0 the disclosure of which is hereby included in the present application.

Several embodiments of the present invention will now be described, by way of example with reference to the accompanying drawing in which.

Figure 1:
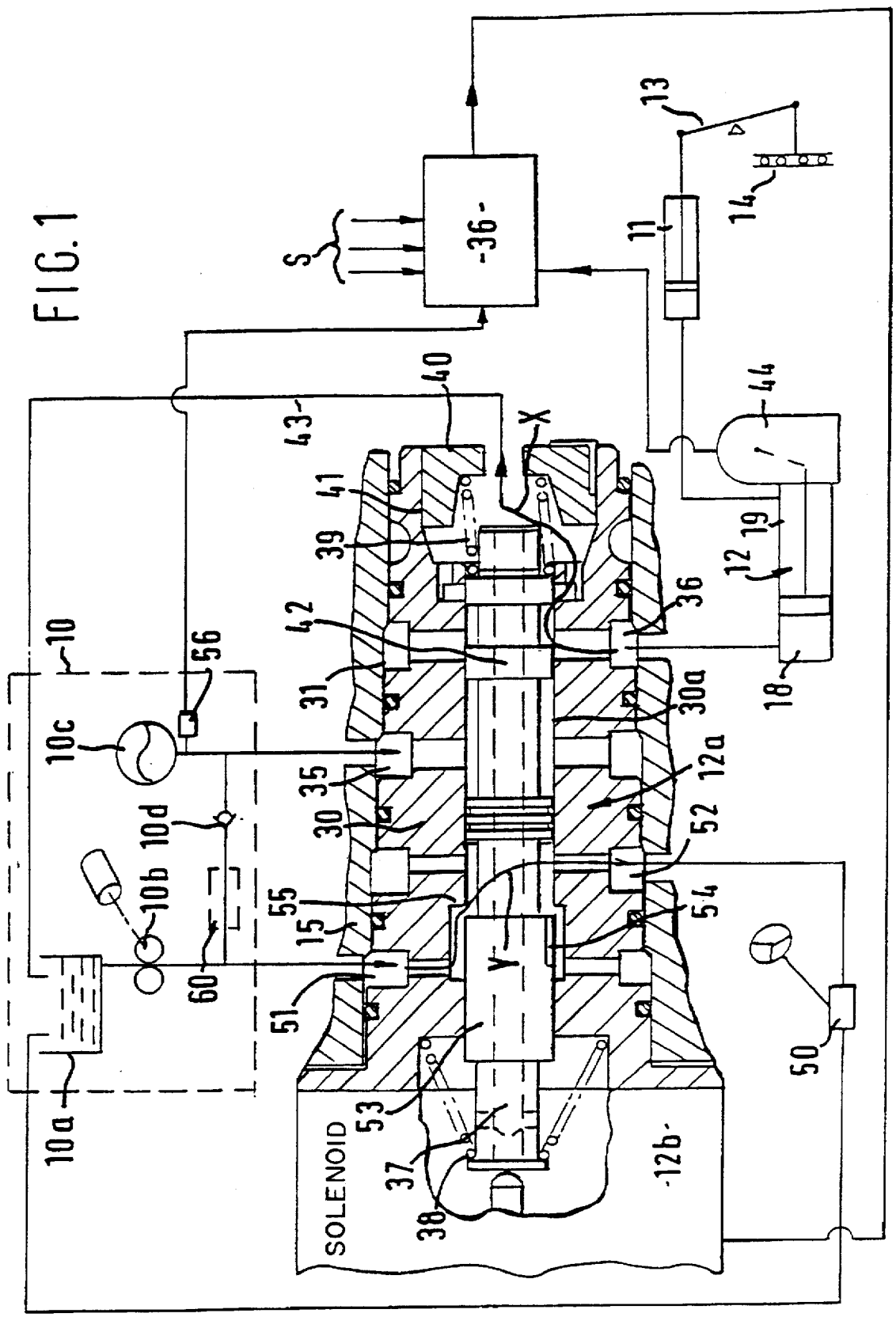
FIG. 1 shows details of a clutch/steering actuation system in accordance with the present invention.

Referring to FIG. 1, the clutch actuation system includes a powerpack 10 which supplies pressurised fluid to a first consumer in the form of an open centre power steering valve 50 and a second consumer in the form of an actuator 12 for a and a second consumer in the form of an actuator 12 for a clutch operating slave cylinder 11. Both consumers are supplied via a value means in the form of a solenoid operated fluid flow control valve 12a. The slave cylinder 11 acts on a clutch actuating lever 13 which in turn operates a clutch release bearing 14.

The powerpack 10 includes a reservoir 10a, an electrically driven pump 10b, an accumulator 10c and a non return valve 10d.

Actuator 12 includes a piston 17 which divides the actuator into two chambers 18 and 19 which are connected with solenoid valve 12a and slave cylinder 11 respectively. Thus pressurisation of chamber 18 displaces piston 17 which expels fluid out of chamber 19 to operate slave cylinder 11 and displace clutch operating lever 13 to disengage the associated clutch.

Displacement of clutch operating lever 13 is measured by a sensor in the form of a rotary potentiometer 44 whose output is fed to an electrical control unit 36. Control unit 36 also receives other vehicle operating parameter inputs, designated S in FIG. 1, and issues commands to the solenoid 12b of valve 12a to connect the actuator 12 to accumulator 10c or reservoir 10a.

Full constructional and operational details of the electronic control unit 36 etc. can be found in the Applicants previously referred to European patent nos. and will not therefore be given here.

Solenoid operated valve 12a comprises an outer portion 30 which is inserted into a bore 31 in a housing 15 and remains stationary therein. Outer portion 30 defines, in conjunction with bore 31, annular feed passages 35 and 36 which are connected respectfully with the accumulator 10c and the actuator 12. Two further annular feed passages 51 and 52 are also defined in a similar manner, feed passage 51 being connected with pump 10b and passage 52 with steering valve 50.

Within outer valve portion 30 is disposed an axially movable landed spool 37 which, when the solenoid valve 12a is not actuated it is maintained in the position shown in FIG. 1 by return springs 38 and 39 respectively. Return spring 39 acts against a threaded nut 40 whose axial position within a threaded bore 41 controls the spring loading on spool 37 as described in the Applicants co pending application no. 9308539.7.

When the spool 37 is in the FIG. 1 position, spool land 42 cuts off communication between annular feed passages 35 and 36 so that the chamber 18 of actuator 12 is not pressurised by the powerpack 10. In this spool position feed passage 36 communicates with reservoir 10a via flow path X and return line 43.

Spool 37 also includes an additional land 53 provided with an axial groove 54 which extends part way along land 53. With the spool 37 in the FIG. 1 position, annular feed passage 51 is in unrestricted communication with feed passage 52 via path Y over shoulder 55 in bore 30a within which spool 37 slides.

The actuation system is completed by a pressure level sensor 56 which provides electrical signals to control unit 36 indicative of the pressure level of the fluid in accumulator 10c. Typically if the pressure level in the accumulator falls below 20 bar this is taken as an indication by control unit 36 that charging of the accumulator is necessary and a pressure level of say 40 bars indicates a fully charged accumulator.

The above described actuation system operates as follows.

With the spool 37 in the FIG. 1 position, as previously indicated, actuator 12 is not pressurised by accumulator 10c so that the clutch operated by the release bearing 14 is engaged. To disengage the clutch the solenoid 12b of valve 12a is actuated to axially displace spool 37 to the right, as viewed in FIG. 1, so that land 42 opens up a communication between annular feed passages 35 and 36 and closes off the return path X to reservoir 10a thus connecting chamber 18 of actuator 12 with accumulator 10c so that piston 17 is displaced to the right, as viewed in FIG. 1, thus displacing fluid out of chamber 19 of actuator 12 into slave cylinder 11 to operate clutch release bearing 14 to disengage the clutch.

It will be appreciated that the above axial movement of spool 37 results in the previously unrestricted flow path Y now taking place via the axial groove 54. The groove 54 is sized such that the volume flow rate available to steering valve 50 is still maintained at a sufficiently high level to ensure an unaffected operation of valve 50 whilst at the same time causing a build up of back pressure on the pump side of the valve 12a which is sufficient to charge the accumulator 10c.

Should pressure sensor 56 indicate that charging of accumulator 10c is necessary (as a result of the pressure level having fallen below a predetermined charge level—typically 20 bars) when the clutch actuator 12 is not being actuated control unit 36 issues a signal to solenoid 12b to displace spool 37 to the right thus bringing groove 54 into the flow path Y so that charging of the accumulator 10c can take place without any effect on the operation of steering valve 50 and without actuating slave cylinder 11.

Thus the restricted flow to steering valve 50 via groove 54 is introduced into the steering circuit when spool 37 is moved by control unit 36 to operate actuator 12 or, if actuator 12 is not under operation, when pressure level sensor 56 indicates that charging of the accumulator is necessary.

The present invention thus provides an actuating system in which the operation of the open centre steering valve 50 is not effected by the charging of the accumulator.

With the actuating system described above there is nothing to control the level to which the accumulator 10c could be charged by pump 10b when the steering is being operated. This may result in the accumulator (which is preferably kept at a pressure level of 30–40 bars) being charged to pressure levels well above 100 bars as a result of back pressure generating on the pump side of steering valve 50 since pressure levels well above 100 bars can be generated in the steering circuit when the valve 50 is in, for example, the full lock position.

If desired, the above problem of high accumulator charging pressures can be overcome by the use of a second valve means 60, shown in dotted detail in FIG. 1, in the line to the accumulator 10c.

Figure 2:
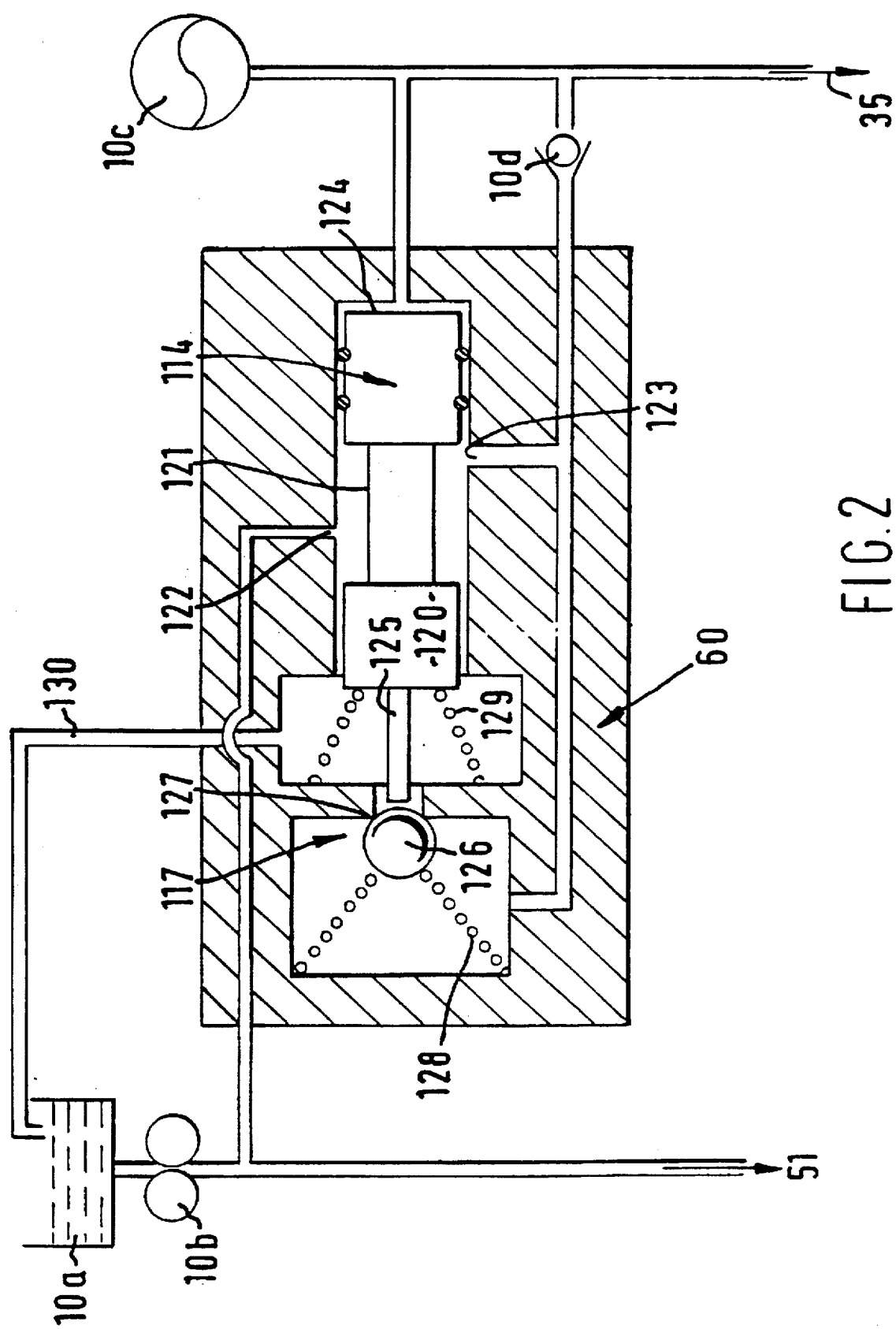
FIG. 2 shows details of a charging and venting valve arrangement which may be used in the system of FIG. 1.

Conveniently, as shown in FIG. 2 the second valve means 60 may comprise a charging valve 114 and venting valve 117 arrangement of the form described in the previously referred to co-pending application Ser. No. 9420983.0.

The charging valve 114 comprises a spool 120 with a waisted portion 121 which controls communication between charging ports 122 and 123 depending on the axial position of the spool. One end 124 of spool 120 is acted upon by the charging pressure on the accumulator side of non-return valve 10d. The other end of spool 120 is formed as rod 125 which is operative to unseat a ball valve member 126 of venting valve 117 which is normally held against an associating venting seat 127 by a spring 128. A main spool control spring 129 also acts on spool 120 to bias the spool to the right as viewed in FIG. 2.

As will be evident from the above, the accumulator pressure acting on end 124 of spool 120 acts against the combined action of main spool control spring 129, light spring 128 and the charging pressure acting on venting valve member 126. The effective cross sectional areas of the end 124 of spool 120 and the area of valve member 126 exposed to the charging pressure are arranged to be substantially different (typically two to one in favour of the end 124 of the spool). Because of the high differential areas used, as soon as the accumulator pressure has risen sufficiently to open venting valve 117 the pressure surrounding ball valve member 126 drops dramatically so that the force acting to the right on spool 120 also drops dramatically and the accumulator pressure acting on the end 124 of spool 120 ensures a rapid movement of the spool to the left to close off charging port 123. This provides a large force holding venting valve member 126 open so that the pressure on the pump side of non return valve 10d is vented to the sump 10a via a line 30. This ensures a clear cut-off level at which the charging of accumulator 10c is cut-off by spool 120.

Similarly it is necessary for the accumulator pressure to fall to a relatively low level compared with the level at which charging of the accumulator is cut-off by spool 120 before spring 129 displaces spool 120 to open charging port 123 and recommence charging of the accumulator 10c. Thus the cut-off of charging and commencement of charging are clearly and efficiently controlled by charging valve 114 and venting valve 117 to provide clear and distinct cut-off and recharging pressure levels.

Figure 3:
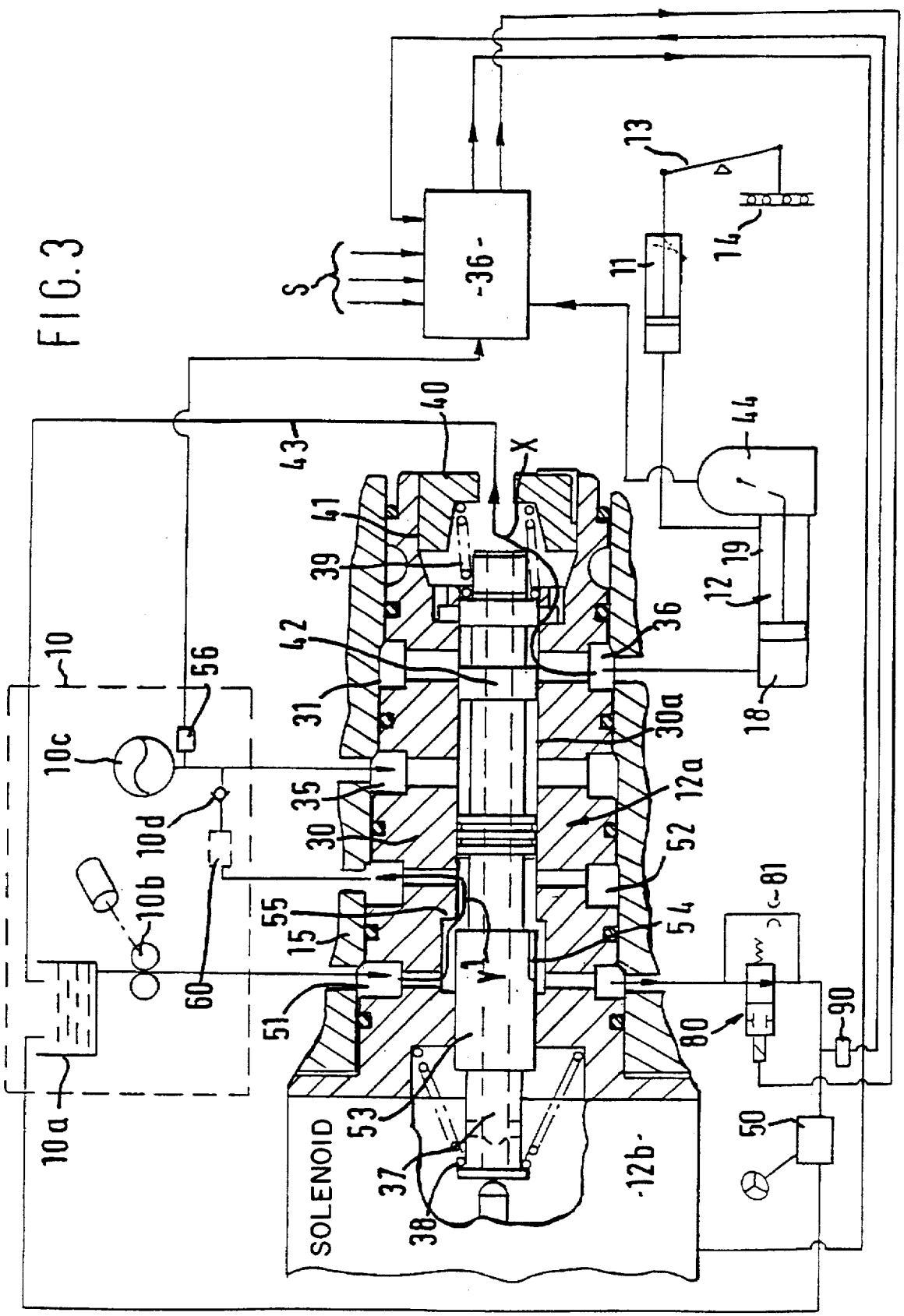
FIG. 3 shows details of a second form of clutch/steering actuation system in accordance with the present invention.

The clutch actuation system of FIG. 3 is basically the same as that of FIG. 1 with the exception that in FIG. 3 the accumulator 10c is charged via annular feed passages 51 and 52 (see path Y') and power steering valve 50 is fed for convenience via charging valve 80 via permanently open feed passage 51. Components of FIG. 3 similar to those of FIG. 2 have been similarly numbered.

When the spool 37 is in the FIG. 3 position, spool land 42 cuts off communication between annular feed passages 35 and 36 so that the chamber 18 of actuator 12 is not pressurised by the powerpack 10. In this spool position feed passage 36 communicates with reservoir 10a via flow path X and return line 43, and annular feed passage 51 is in unrestricted communication with feed passage 52 via path Y' so that the charging rate of accumulator 10c is not restricted.

Pressure level sensor 56 provides electrical signals to actuate, via control unit 36, charging valve 80 with a parallel coupled flow restrictor 81.

Typically if the pressure level in the accumulator falls below 20 bar sensor 56 closes charging valve 80 to divert flow to the steering valve 50 via flow restriction 81. This causes a back pressure to build up on the pump side of valve 80 which ensures adequate charging of accumulator 10c whilst still ensuring effective operation of steering valve 50.

The actuation system also includes a pressure sensor 90 which produces an output signal to control unit 36 when the pressure in the steering valve circuit has risen to 2 to 3 bar thus indicating that the steering valve 50 is operative. Operating pressures of 80–100 bar are not uncommon in such steering valve circuits when the valve is in the full-lock condition.

The actuation system of FIG. 3 operates as follows.

With the spool 37 in the FIG. 3 position, as previously indicated, actuator 12 is not pressurised by accumulator 10c so that the clutch operated by the release bearing 14 is engaged. To disengage the clutch the solenoid 12b of valve 12a is actuated to axially displace spool 37 to the right, as viewed in FIG. 3, so that the land 42 opens up a communication between annular feed passages 35 and 36 and closes off the return path X to reservoir 10a thus connecting chamber 18 of actuator 12 with accumulator 10c so that piston 17 is displaced to the right as viewed in FIG. 3, thus displacing fluid out of chamber 19 of actuator 12 into slave cylinder 11 to operate clutch release bearing 14 to disengage the clutch.

It will be appreciated that the above axial movement of spool 37 results in the previously unrestricted accumulator charging path Y' now taking place via the axial groove 54 in land 53. The groove 54 is sized such that the volume flow rate available to charge accumulator 10c ensures that sufficient flow is still available to steering valve 50 to ensure unaffected operation of valve 50.

Should pressure sensor 56 indicate that charging of accumulator 10c is necessary (as a result of the pressure level having fallen below a predetermined charge level—typically 20 bar) control unit 36 issues a signal to charging valve 80 to switch flow through the restrictor 81 to build up a back pressure to ensure charging of the accumulator 10c can take place at a rate which will not effect the operation of steering valve 50.

When sensor 90 sends a signal to control unit 36 indicating operation of steering valve 50, control unit 36 issues a signal to the solenoid 12b of valve 12a to move spool 37 to the right sufficient to restricting the charging flow to accumulator 10c using groove 54 without actuating slave cylinder 11. Thus uneffected operation of steering valve 50 can take place during charging of accumulator 10c. With a more sophisticated control unit 36 the spool 37 may not necessary be displaced on every occasion when the steering valve 50 is operating. For example, if the steering valve is making small steering connection either side of the straight ahead position, the control unit could be set up to permit unrestricted charging of the accumulator.

Again as described in relation to FIG. 1, if desired, the problem of high accumulator charging pressures can be overcome by the use of a second valve means 60, shown in dotted detail in FIG. 3, in the line to the accumulator 10c.

Conveniently, the second valve means 60 may comprise a charging valve 114 and venting valve 117 arrangement similar to that described in relation to FIG. 2.

Figure 4:
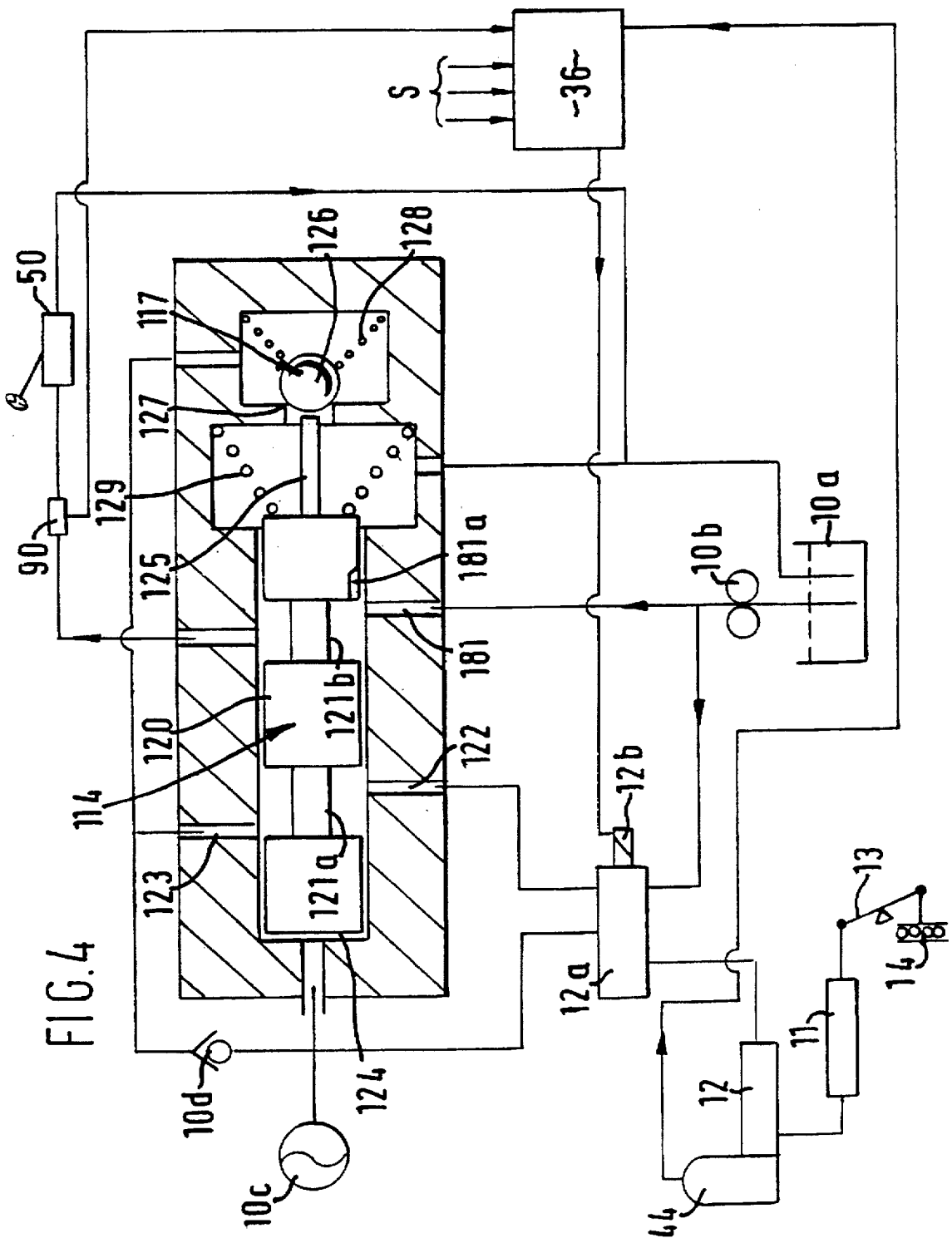
FIG. 4 shows details of a further form of clutch/steering actuation system in accordance with the present invention which employs a charging and venting valve arrangement similar to that shown in FIG. 2.

Referring to FIG. 4 this shows an actuation system employing such a charging valve 114 and venting valve 117 arrangement the charging valve 114 comprising a spool 120 with two waisted portions 121a and 121b as compared with the single waisted portion 121 in FIG. 2. Waisted portion 121a controls communications between charging ports 122 and 123 depending on the axial position of the spool. Waisted portion 121b and an associated axially extending flow restricting groove 181a control flow through a steering port 181 which performs the function of resrictor 81 in the FIG. 3 construction.

One end 124 of spool 120 is acted upon by the charging pressure on the accumulator side of non-return valve 10d. The rod end 125 of spool 120 is operative to unseat ball valve member 126 of venting valve 117 which is normally held against an associating venting seat 127 by a spring 128. A main spool control spring 129 also acts on spool 120 to bias the spool to the left as viewed in FIG. 4.

As will be evident from the above, the accumulator pressure acting on end 124 of spool 120 acts against the combined action of main spool control spring 129, light spring 128 and the charging pressure acting on venting valve member 126. The effective cross sectional areas of the end 124 of spool 120 and the area of valve member 126 exposed to the charging pressure are arranged to be substantially different (typically two to one in favour of the end 124 of the spool). Because of the high differential areas used, as soon as the accumulator pressure has risen sufficiently to open venting valve 117 the pressure surrounding ball valve member 126 drops dramatically so that the force acting to the left on spool 120 also drop dramatically and the accumulator pressure acting on the end 124 of spool 120 ensures a rapid movement of the spool to the right to close off charging port 123. This provides a large force holding venting valve member 126 open so that the pressure on the pump side of non return valve 10d is vented to the sump 10a via a line 30. This ensures a clear cut-off level at which the charging of accumulator 10c is cut-off by spool 120.

Similarly it is necessary for the accumulator pressure to fall to a relatively low level compared with the level at which charging of the accumulator is cut off by spool 120 before spring 129 displaces spool 120 to open charging port 123 and recommence charging of the accumulator 10c. Thus the cut-off of charging and commencement of charging are clearly and efficiently controlled by charging valve 114 and venting valve 117 to provide clear and distinct cut-off and recharging pressure levels.

As will be apparent from the above, flow restricting groove 181a co-operates with steering port 181 to restrict the flow of fluid to steering valve 50 when charging port 123 is open and accumulator 10c is being charged by pump 10b. This restriction of the steering circuit is removed when spool 120 is moved to the right to close off port 123.

Thus in the FIG. 4 construction the extra waisted portion 121b, on spool 120 with its co-operating steering port 181 and groove 181a replace the function of charging valve 80, restrictor 81 and pressure sensor 56 in the FIG. 3 construction.

Figure 5:
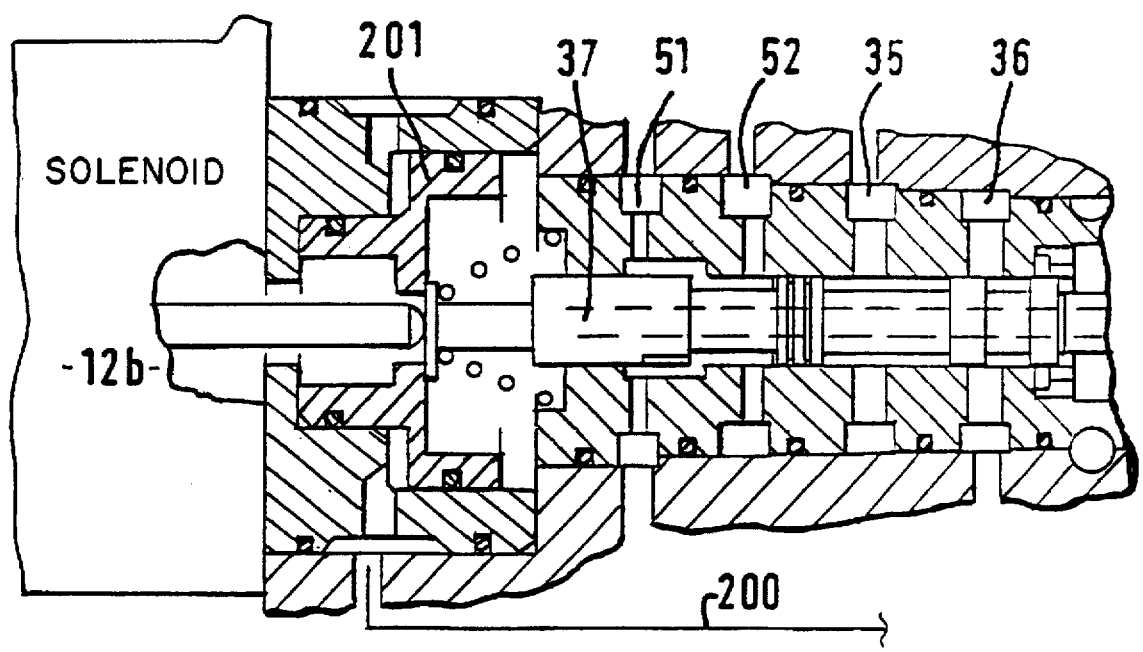
FIG. 5 shows an alternative form of part of the system shown in FIG. 4.

FIG. 5 shows part of a modified form of the system shown in FIG. 4 in which pressure sensor 90 which operates the solenoid valve 12a is replaced by a pressure tapping 200 from the steering circuit between steering valve 50 and charging/venting valve 114/117. Tapping 200 is connected with an auxiliary piston 201 which acts on the end of the spool 37 of valve 12a to displace spool 37 when the pressure level in tapping 200 indicates that the steering valve 50 is being operated thus restricting the potential charging rate of accumulator 10c.

The solenoid actuation of spool 37 to control the pressure supplied to actuator 12 is still retained down the centre of piston 201 as indicated diagrammatically at 12b in FIG. 5.

I claim:

1. An actuation system comprising:

at least one first consumer actuated from the pump;

at least one second consumer actuated via a valve means from an accumulator charged by the pump;

the valve means being operable to connect said at least one second consumer to the accumulator or to the reservoir thus actuating said at least one second consumer and also being operable in response to accumulator pressure levels below a predetermined charge level to restrict the flow of fluid to said at least one first consumer to a level sufficient to ensure effective operation of said at least one first consumer while generating a back pressure sufficient to ensure charging of the accumulator;

the valve means including a valve having a valve member which is displaceable both to connect said at least one second consumer to the accumulator or reservoir and also to restrict the flow of fluid to said at least one consumer.

2. A system according to claim 1 in which both the first and second consumers are actuated via the valve means.

3. A system according to claim 2 which includes second valve means which limits the pressure level to which the accumulator can be charged.

4. A system according to claim 1 in which the valve member is displaced by a solenoid which is activated both by a control means and also by signals from an accumulator pressure level sensor.

5. A system according to claim 1 in which the valve member is displaced by a solenoid which is activated both by a control means and also by a direct action of accumulator pressure on the valve member.

6. A system according to claim 1 in which the valve member is a spool having groove means through which the restricted communication to said at least one first consumer takes place.

7. A system according to claim 1 which includes second valve means which limits the pressure level to which the accumulator can be charged.

8. An actuation system comprising:

at least one first consumer actuated from the pump;

at least one second consumer actuated via a valve means from an accumulator charged by the pump;

the valve means being operable to connect said at least one second consumer to the accumulator or to the reservoir thus actuating said at least one second consumer and also being operable in response to accumulator pressure levels below a predetermined charge level to restrict the flow of fluid to said at least one first consumer to a level sufficient to ensure effective operation of said at least one first consumer while generating a back pressure sufficient to ensure charging of the accumulator;

the valve means includes a valve having a valve member which is displaced both to connect said least one second consumer to the accumulator or reservoir and also to control a rate of charging of the accumulator.

9. A system according to claim 8 in which the valve member is displaced by a solenoid which is activated both by a control means and also by signals indicating operation of said at least one first consumer.

10. A system according to claim 9 in which the operation of said at least one first consumer is detected by a pressure level sensor which indicates a rise in pressure indicative of the operation of said at least one first consumer.

11. A system according to claim to claim 9 in which the operation of said at least one first consumer is detected by a pressure tapping from said at least one first consumer which directs pressure onto the valve member.

12. A system according to claim 9 in which the valve means also includes a separate charging valve means to restrict the flow of fluid to said at least one first consumer at accumulator pressure levels below said predetermined charge level.

13. A system according to claim 9 in which the valve member is a spool having groove means through which the restricted communication for the accumulator takes place.

14. A system according to claim 8 in which the valve means also includes a separate charging valve means to restrict the flow of fluid to said at least one first consumer at accumulator pressure levels below said predetermined charge level.

15. A system according to claim 14 in which the charging valve means comprises a solenoid operated valve which switches flow to said at least one first consumer through a flow restrictor at accumulator pressure levels below said predetermined charge level.

16. A system according to claim 8 in which the valve member is a spool having groove means through which the restricted communication for the accumulator takes place.

* * * * *